United States Patent [19]

Bower et al.

[11] Patent Number: 4,649,970

[45] Date of Patent: Mar. 17, 1987

[54] MAGNETICALLY ACTUATED VAPOR VALVE

[75] Inventors: Allen M. Bower; Robert D. Roberts, both of Conneaut, Ohio

[73] Assignee: Emco Wheaton, Inc., Conneaut, Ohio

[21] Appl. No.: 789,076

[22] Filed: Oct. 18, 1985

[51] Int. Cl.⁴ .................. B65B 31/00; F16K 17/28
[52] U.S. Cl. ........................ 141/302; 141/DIG. 1; 141/59; 141/45; 141/290; 141/392; 137/909; 251/65
[58] Field of Search ......... 141/301, 302, 392, DIG. 1, 141/DIG. 2, 44, 45, 46, 65, 59, 207, 219, 225, 226, 285, 290; 137/87, 909, 587, 589; 251/65

[56] References Cited

U.S. PATENT DOCUMENTS

| | | | |
|---|---|---|---|
| 4,057,085 | 11/1977 | Shihabi | 141/59 |
| 4,131,142 | 12/1978 | Barr et al. | 141/302 |
| 4,143,689 | 3/1979 | Conley et al. | 141/207 |
| 4,202,385 | 5/1980 | Voelz et al. | 141/59 |
| 4,286,635 | 9/1981 | McMath | 141/98 |
| 4,320,788 | 3/1982 | Lord | 141/290 |
| 4,574,833 | 3/1986 | Custer | 137/498 |

*Primary Examiner*—Stephen Marcus
*Assistant Examiner*—Ernest G. Cusick
*Attorney, Agent, or Firm*—Pearne, Gordon, McCoy & Granger

[57] ABSTRACT

A vapor valve is useful in a vapor recovery nozzle of the type used to dispense fuel to motor vehicles. In response to the stopping of liquid through the valve, the valve stops the flow of vapor through an adjacent passage. The valve operates using coupled permanent magnet actuators.

11 Claims, 3 Drawing Figures

MAGNETICALLY ACTUATED VAPOR VALVE

BACKGROUND OF THE INVENTION

1. Field of the Invention

This invention relates to a valve for stopping the flow of vapor through a passage in response to the stopping of the flow of liquid in another passage, and more particularly to such a valve having a permanent or constantly energized magnet actuator.

2. Description of the Prior Art

In various applications, it is necessary to control the flow of vapor through a vapor passage in response to the flow of liquid through an adjoining passage. In such applications, the vapor flow must be stopped when the flow of liquid is stopped.

One such application for such a valve is in vapor recovery systems using nozzles of the type used to dispense gasoline or other fuels at service stations. Examples of such nozzles are shown in U.S. Pat. Nos. 4,143,689 issued to Conley et al. and 4,286,635 issued to McMath. Such nozzles have a liquid passage through which fuel flows to the fuel tank of a motor vehicle. Such nozzles also have a vapor passage for the recovery of vapor evacuated from the fuel tank. Such vapor travels from the tank to a vapor recovery storage receptacle. In order to retain the vapor in the storage receptacle, it is important that the vapor passage be closed when the nozzle is removed from the fuel tank.

In the past, vapor check valves have been installed in the vapor passage adjacent to the pump housing to close the vapor passage when the nozzle is removed from the fuel tank. Such check valves have included, for example, a solenoid valve which operates in response to an electrical signal generated by the pump control to close the vapor passage when the pump stops supplying fuel to the liquid passage. However, such valves are expensive and difficult to install. Nonelectrical check valves have also been used in which the valve senses a pressure drop in the liquid passage and shuts off the vapor passage in response thereto. Such valves are relatively expensive and are frequently undependable. If a mechanical connection is provided between the liquid sensing portion and the vapor shut off portion, the connection must be properly sealed. Such seals eventually tend to leak, resulting in fuel leaking into the vapor recovery passage.

SUMMARY OF THE INVENTION

The present invention provides a valve which shuts off vapor flow in the vapor recovery passage which overcomes the problems of the prior art. Such a valve is small and easily operable and very dependable. Due to the simplicity of construction of the valve, the valve is relatively inexpensive to manufacture and is easy to install.

The valve of the present invention automatically shuts off the flow of vapor through a vapor passage when the flow of liquid through an adjoining passage has ceased and re-opens the vapor passage when liquid flow resumes. Thus, in vapor recovery fuel dispensing systems, the valve may be installed to automatically close the vapor recovery storage tank and prevent the escape of vapor as soon as fuel stops flowing through the dispensing line and to automatically open the vapor recovery storage tank each time fuel is dispensed.

The valve of the present invention operates through the attraction of permanent magnets. Magnetic attraction between a magnetic closure in the liquid passage and a magnetic portion on the poppet in the vapor passage retains the poppet in position to close the vapor passage. The flow of liquid through the liquid passage moves the magnetic closure in the liquid passage. The poppet in the vapor passage moves in response to the movement of the closure in the liquid passage to open the vapor passage. When the flow of liquid ceases, the closure returns to its original position and due to magnetic attraction between the closure and the poppet, it pulls the poppet back to its closed position.

These and other advantages are achieved by the present invention of a vapor shut-off valve comprising a body having a liquid passage and a vapor passage. The vapor passage has a first chamber and the liquid passage has a second chamber adjacent to the first chamber. The first chamber is separated from the second chamber by a thin wall. A poppet is positioned in the first chamber of the vapor passage and is movable between a closed position in which the flow of vapor through the vapor passage is blocked and an open position in which vapor can flow through the vapor passage. The poppet has a permanent magnet portion adjacent to the thin wall. A closure is positioned in the second chamber of the liquid passage. The closure rests in a closed position restricting the flow of liquid through the second chamber of the liquid passage. The closure is movable to an open position in response to the flow of liquid through the second chamber. The closure is formed at least in part of a permanent magnet adjacent to the thin wall. The poles of the magnet of the closure are opposite the adjacent poles of the magnet portion of the poppet so that the magnetic attraction between the poppet and the closure causes the poppet to remain in the closed position in response to the presence of the closure to the closed position.

When the closure moves to the open position in response to the flow of liquid through the liquid passage, it moves away from the thin wall, and the magnetic attraction between the poppet and the closure decreases, allowing the poppet to move to the open position and permit the flow of vapor through the vapor passage.

DETAILED DESCRIPTION OF THE PREFERRED EMBODIMENT

Figure 1:
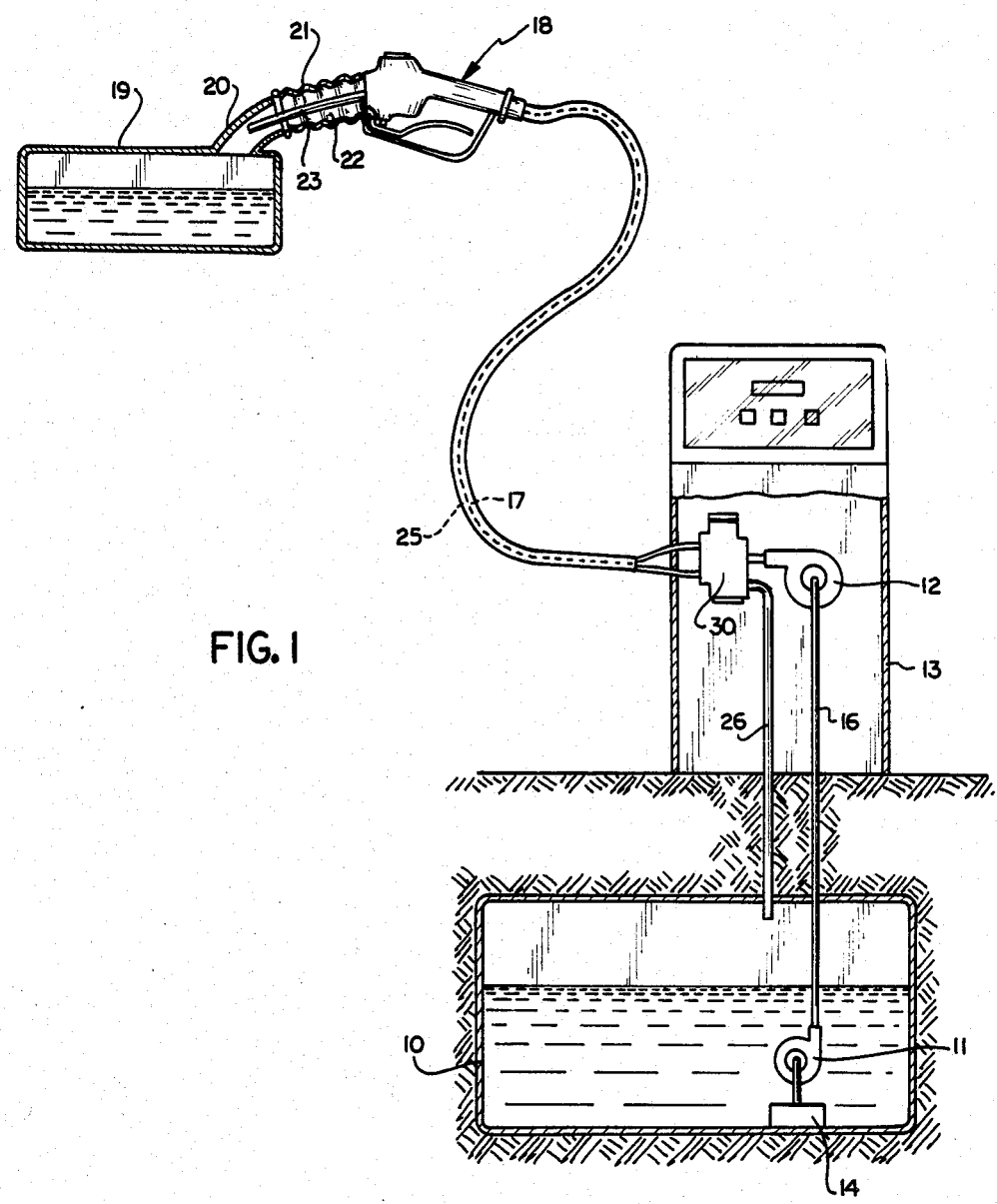
FIG. 1 is a schematic diagram showing a fuel dispensing system with vapor recovery which includes the valve of the present invention.

Referring more particularly to the drawings, and initially to FIG. 1, there is shown a fuel dispensing system which includes a fuel storage tank 10 of the type normally found in a service station. The tank 10 is provided with an electrically driven fuel supply pump 11 adapted to be actuated for removing a stream of gasoline or other fuel. The pump 11 can be submerged in the fuel tank 10 as shown in FIG. 1 or the pump can be located at ground level as indicated by the position of the pump 12 which is located within a pump enclosure 13. The pump 11 may be provided with a filter 14 on the suction side of the pump, or alternatively other means for filtering fuel may be provided prior to its passing upwardly.

The pump 11 discharges the fuel by way of a conduit 16 which extends from the tank 10 into the pumping enclosure 13. The conduit 16 in turn communicates with a flexible elongated conduit 17 which supplies the fuel to a dispensing nozzle 18. The dispensing nozzle 18 provides the fuel to a fuel tank 19 by means of a filler pipe 20. When the nozzle 18 is engaged with the filler pipe 20, a resilient walled boot 21 is deformed to provide an annular passage or chamber 22 around a nozzle spout 23 which extends from the dispensing nozzle 18 through the chamber 22 to provide fuel from the conduit 17 to the filler pipe 20.

During the fuel transfer operation as fuel is discharged into the fuel tank 19, it displaces vapor from the tank 19 which is returned to the fuel storage tank 10 through the chamber 22 and through a second elongated flexible conduit 25 which communicates with a conduit 26 extending from the enclosure 13 downwardly into the fuel storage tank 10. The vapor return conduit 25 and the fuel dispensing conduit 17 are both formed within the flexible conduit enclosure.

A problem arises in the vapor recovery system in that vapor from the fuel storage tank 10 can escape through the conduit 25 and through the chamber 22 formed in the fuel dispensing nozzle 18 when the nozzle is removed from the fuel tank 19 after the fuel dispensing process has concluded. Between fueling operations while the nozzle 18 is stored, significant amounts of fuel vapors can escape through this passageway. To prevent this undesirable escape of vapors, a check valve is typically inserted between the flexible conduit 25 and the vertically extending conduit 26. However, such a check valve is generally unreliable unless it is somehow operated either by the electrical operation of the pump 11 or 12 or by a sensing device in the conduit 16 to sense the presence of liquid flow. However, an electrically operated check valve in the conduit line 26 is relatively expensive.

To overcome the problems of the prior art, a valve 30 is provided in accordance with the present invention. The valve 30 is connected on one side to the fuel conduit 16 and the vapor return conduit 26 and is connected on the other side to the elongated flexible fuel dispensing conduit 17 and the elongated flexible vapor return conduit 25.

Figure 3:
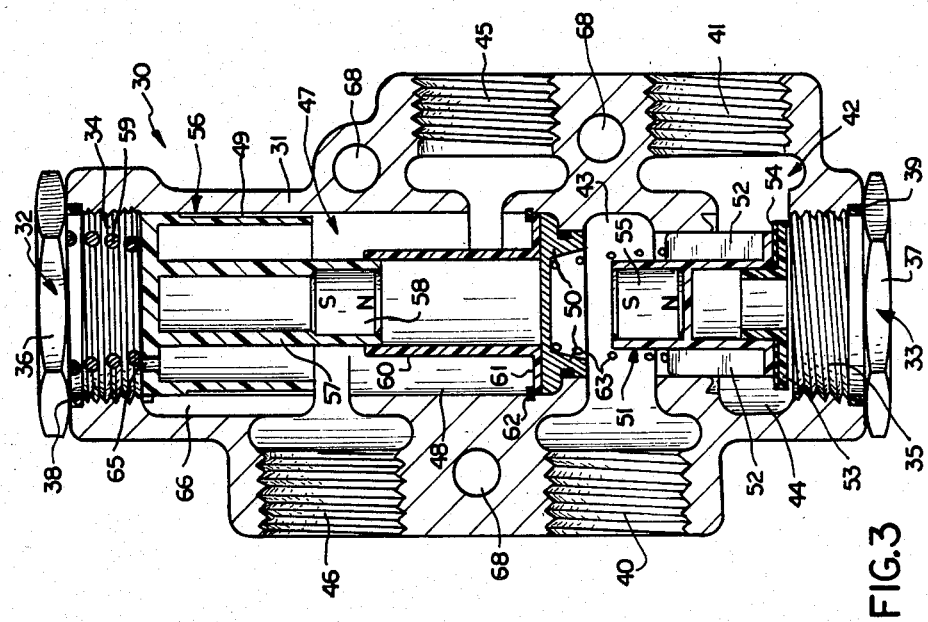
FIG. 3 is a cross-sectional view similar to FIG. 2 showing the valve in the open position.
Figure 2:
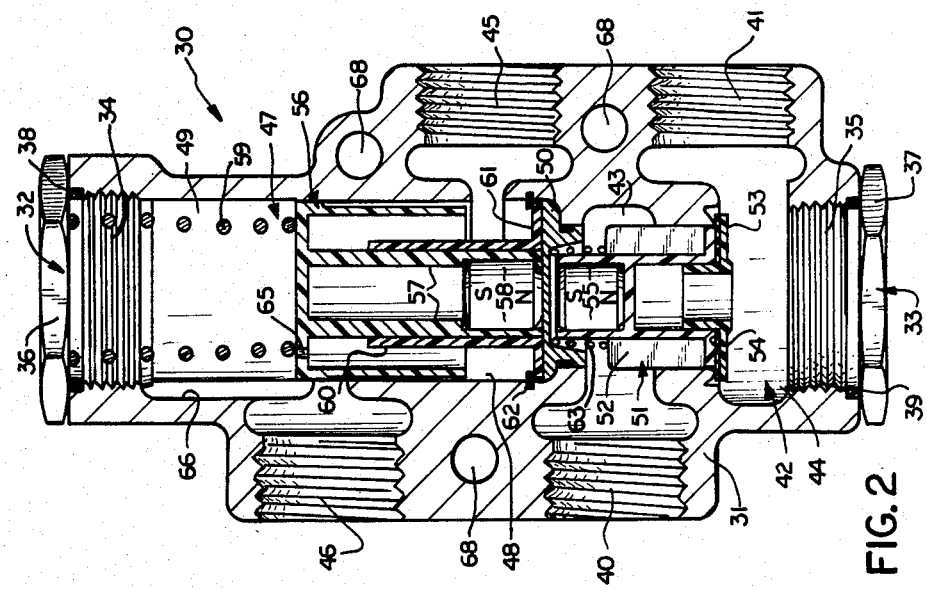
FIG. 2 is a cross sectional view of the valve of FIG. 1 showing the valve in the closed position.

FIGS. 2 and 3 show the valve 30 of the present invention in greater detail. The valve 30 includes a body formed of a housing 31 having a central longitudinally extending bore. The bore is closed at each end by a pair of end caps 32 and 33. The end cap 32 is attached to one end of the housing 31 by means of threads 34, and the end cap 33 is attached to the other end of the housing 31 by means of threads 35. The end of each of the caps 32 or 33 includes a head 36 or 37, respectively, which is preferably hex-shaped to permit the end cap to be rotated and screwed into the end of the bore in the housing 31. Suitable seals 38 and 39 are provided between the housing 31 and the end caps 32 and 33, respectively, between the threads and the head.

The valve housing 31 is preferably formed of a non-magnetic material such as aluminum, and may be initially cast. After casting the valve housing 31, the central longitudinal bore may be finished by appropriate machining and the various threaded openings in the housing may be formed by tapping.

The valve 30 includes a vapor passage extending between a vapor inlet 40 formed on one side of the valve housing 31 and a vapor outlet 41 on the other side of the valve housing. The conduit 25 is connected to the vapor inlet 40, and the conduit 26 is connected to the vapor outlet 41. The vapor passage includes a first chamber 42 formed within the central longitudinally extending bore of the housing 31. The first chamber 42 comprises an upper chamber portion 43 adjacent to the vapor inlet 40 and a lower chamber portion 44 adjacent to the vapor outlet 41.

The valve 30 also has a liquid passage extending between a liquid inlet 45 formed on one side of the valve housing 31 adjacent to the vapor outlet 41 and a liquid outlet 46 formed on the opposite side of the housing adjacent to the vapor inlet 40. The conduit 16 is connected to the liquid inlet 45 and the conduit 17 is connected to the liquid outlet 46. Between the inlet 45 and the outlet 46, the liquid passage also includes a second chamber 47 located within the longitudinal extending bore in the housing 31. The second chamber 47 comprises a lower chamber portion 48 adjacent to the liquid inlet 45 and an upper chamber portion 49 adjacent to the liquid outlet 46.

The first chamber 42 is separated from the second chamber 47 by means of an insert 50 mounted in the longitudinal bore of the housing 31 between the lower second chamber portion 48 and the upper first chamber portion 43. The insert 50 provides a thin wall separating the respective chambers. The insert 50 is also formed of a non-magnetic material such as brass.

To stop the flow of vapor through the vapor passage, a poppet 51 is positioned within the first chamber 42. The poppet 51 is formed of a non-magnetic material such as plastic. The poppet 51 is positioned mainly in the upper chamber portion 43 and is generally cylindrical with vanes 52 extending from its sides. The poppet 51 includes a head 53 which is of increased diameter and which is located in the lower chamber portion 44. The diameter of the head 53 is larger than the diameter of the opening between the chamber portions 43 and 44 so that, when the poppet 51 rests in its upper position as shown in FIG. 2, a seal 54 on the poppet head 53 engages the rim of the opening between the chambers 43 and 44 to seal the vapor passage closed. When the poppet 51 is in its lower position as shown in FIG. 3, the head 53 of the poppet 51 is clear of the opening between the chamber portions 43 and 44 and is positioned adjacent the end cap 33 so that vapor is free to flow through the passage between the vanes 52 of the poppet. A small spring 63 is positioned between the insert 50 and the top of the vanes 52 of the poppet 51 to urge the poppet toward its lower position.

The top portion of the poppet 51 includes a permanent magnet 55 in which the top part of the magnet adjacent to the insert 50 is of one polarity S, the bottom portion of the magnet away from the insert is of opposite polarity N.

Within the second chamber 47 is a closure 56. The closure 56 is generally cylindrical in shape with an outer diameter approximately the same as the diameter of the chamber 47 so that the closure functions as a piston within the chamber to block the chamber when it is in its lower position as shown in FIG. 2. The closure 56 includes an inner portion 57 which extends downwardly. At the bottom of the inner portion is a permanent magnet 58 similar to the magnet 55 of the poppet 51.

The inner portion 57 of the closure 56 fits within a tubular guide 60 which extends upwardly from the insert 50. The guide 60 includes a tubular portion within which the portion 57 of the closure fits and a rim 61 which extends across the open bore of the housing 31. The guide 60 is held in place by a retaining ring 62 which fits within a corresponding groove in the bore of the housing 31 and holds the rim 61 of the guide 60 in place against the insert 50. In addition, this holds the insert 50 in place against a ledge formed in the inside bore of the housing 31.

The permanent magnet 58 is similar to the permanent magnet 55 in that the bottom portion of the magnet 58 adjacent to the insert 50 is of one polarity N and the portion of the magnet away from the insert 50 is of opposite polarity S. The polarity N of the magnet 58 adjacent to the insert 50 is opposite the polarity S of the magnet 55 adjacent to the insert so that the magnets 55 and 58 are in an orientation of mutual attraction, and the magnets 55 and 58 are attracted to each other. Therefore, the poppet 51 is attracted to the closure 56. The small spring 63 assists in the magnetic attraction of the poppet 51 to the closure 56. The spring 63 is located within the lines of flux between the magnets 55 and 58, and the spring's presence enhances the magnetic effect to provide a stronger magnetic force upon the poppet 51.

As shown in FIG. 2, the closure 56 fits snugly within the second chamber 47 and essentially restricts or blocks the flow of liquid through the liquid passage. However, the closure 56 is capable of being moved upwardly in response to the flow of liquid through the liquid passage. When the closure 56 moves upwardly, it moves into the upper chamber portion 49 so that liquid is free to move through the passage as shown in FIG. 3. When the flow of liquid ceases, the closure 56 drops down to its resting position in the lower chamber portion 48 in which it restricts or blocks the flow of liquid through the passage. A spring 59 is located in the upper chamber 49 between the head 36 and the top of the closure 56 to urge the closure back to the resting position when the flow of liquid stops.

When the closure 56 is in its lower resting position as shown in FIG. 2, the magnetic attraction between the magnets 55 and 58 causes the poppet 51 to be pulled upwardly to its upper resting position as shown in FIG. 2. When the poppet 51 is in its upper resting position, the seal 54 on the head 53 of the poppet closes the opening between the upper chamber portion 43 and the lower chamber 44 to seal the vapor passage. When liquid flows through the liquid passage and the closure 56 is moved upwardly within the second chamber 47, the permanent magnet 58 moves away from the permanent magnet 55. When the magnet 58 has moved sufficiently far away from the magnet 55, the poppet 51 is no longer pulled upwardly and it drops down within the first chamber 42 to open the vapor passage.

Thus, when there is no liquid flowing through the liquid passage, the valve assumes the configuration shown in FIG. 2 in which the closure 56 is resting in its lower or closed position, and the vapor passage is closed because the poppet 51 is pulled up to its upper or closed or sealing position. When the liquid flows through the liquid passage, it forces the closure 56 upwardly. Because the magnetic coupling between the magnets 55 and 58 is lost as the permanent magnet 58 moves away, the valve poppet 51 drops down under the force of gravity and spring 63 to open the vapor passage. The vapor travels around and between the vanes 52 in the poppet 51 between the upper chamber 43 and the lower chamber 44. The vanes 52 serve to position the poppet within the opening when it is in its lower or open position. When the flow of liquid stops, the closure 56 falls assisted by spring 59 and the permanent magnet 58 falls back into position adjacent the thin wall of the insert 50. The proximity of the magnet 58 pulls the magnet 55 to it and pulls the valve poppet 51 back to its upper or closed position.

A pressure balance hole 65 is provided in the top of the closure 56, and a pressure balance groove 66 is provided in the sidewall of the upper second chamber portion 49 adjacent the liquid outlet 46, so that the closure 56 can easily return to its lower resting position as shown in FIG. 2. The hole 65 and the groove 66 prevent the closure 56 from remaining in its upper position due to a vacuum pull in the upper chamber.

The valve housing 31 may also be provided with a plurality of mounting holes 68 through which bolts or other fasteners may be inserted to mount the valve 30 to the pump enclosure 13 or elsewhere as desired.

Various modifications to the valve of the present invention are possible. For example, while the first and second chambers have been shown adjacent to each other in the central bore of the valve, it is also possible to have concentric chamber arrangement in which one chamber is formed in the middle of the valve and the second chamber is formed around the first chamber. The permanent magnets employed would thus be annular in shape but would still function to move the valve poppet in response to the closure in the liquid passage.

In the many installations, the valve will remain upright so that gravity alone may cause the closure 56 to fall when the flow of liquid ceases. In such installations, the spring 59 may be omitted. However, if it is desirable to mount the valve at some other attitude, the spring 59 should be installed to force the closure 56 to the lower position if there is no flow of liquid.

While the valve 30 is shown in FIG. 1 mounted inside the pump enclosure 13, the valve may also be mounted outside the enclosure 13 or on the concrete island adjacent to the pump.

While the invention has been shown and described with respect to a particular embodiment thereof, this is for the purpose of illustration rather than limitation, and other variations and modifications of the specific embodiment herein shown and described will be apparent to those skilled in the art all within the intended spirit and scope of the invention. Accordingly, the patent is not to be limited in scope and effect to the specific embodiment herein shown and described nor in any other way that is inconsistant with the extent to which the progress in the art has been advanced by the invention.

What is claimed is:

1. A vapor valve, comprising:
   a body having a liquid passage and a vapor passage, the vapor passage having a first chamber, the liquid passage having a second chamber adjacent to the first chamber, the first chamber separated from the second chamber by a thin wall;
   a poppet positioned in the first chamber of the vapor passage and movable between a closed position in which the flow of vapor through the vapor passage is blocked and an open position in which a vapor can flow through the vapor passage, the poppet having a permanent magnet portion adjacent to the thin wall; and a closure positioned in the second chamber of the liquid passage, the closure resting in a closed position restricting the flow of liquid through the second chamber of the liquid passage, the closure movable to an open position in response to the flow of liquid through the second chamber, the closure being formed at least in part of a permanent magnet adjacent to the thin wall, the poles of the magnet of the closure being opposite the adjacent poles of the magnet portion of the poppet so that the magnetic attraction between the poppet and the closure causes the poppet to remain in the closed position in response to the presence of the closure to the closed position and causes the poppet to move to the open position in response to movement of the closure to the open position.

2. A vapor valve as defined in claim 1, wherein the permanent magnet portion of the poppet is adjacent to the thin wall when the poppet is adjacent to the thin wall when the poppet is in the closed position, and wherein the permanent magnet of the closure is adjacent the thin wall when the closure is in the closed position, whereby the poppet is urged to its closed position by attraction of the magnet of the closure.

3. A vapor valve as defined in claim 2, comprising in addition a magnetic force conducting element between the thin wall and poppet to enhance the magnetic attraction of the magnet of the closure.

4. A vapor valve as defined in claim 3, wherein the magnetic force conducting element is a spring which also urges the poppet to its open position.

5. A vapor valve as defined in claim 1, comprising in addition a spring which urges the closure to its closed position when the flow of liquid through the second chamber is stopped.

6. A vapor valve, comprising:
a body having a liquid inlet and a liquid outlet and a liquid passage formed therebetween, the body also having a vapor inlet and a vapor outlet in a vapor passage formed therebetween, the vapor passage having a first chamber formed of an upper chamber portion and a lower chamber portion, the liquid passage having a second chamber adjacent to the first chamber, the second chamber being formed of an upper chamber and a lower chamber portion, the first chamber separated from the second chamber by a thin wall;
a poppet having a sealing head which is larger than the opening between the upper chamber portion of the first chamber and the lower chamber portion of the first chamber, the poppet positioned in the first chamber of the vapor passage and movable between an upper position in which the head engages the opening between the first chamber portion and the second chamber portion to block the flow of vapor through the vapor passage and a lower position in which the head is positioned in the lower chamber portion so that the vapor can flow through the vapor passage, the poppet resting in its lower position, the poppet having a permanent magnet portion at its upper end adjacent to the thin wall when the poppet is in its upper position; and
a cylindrical closure positioned in the second chamber of the liquid passage, the closure resting in a lower position in which is restricts the flow of liquid through the second chamber of the liquid passage, the closure movable to an upper position in the upper chamber portion of the second chamber in response to the flow of liquid, the closure having a permanent magnet portion positioned at its lower end adjacent to the thin wall when the closure is in its lower position, the poles of the magnet portion of the poppet being opposite the adjacent poles of the magnet portion of the closure so that magnetic attraction between the poppet and the closure causes the poppet to remain in or move to its upper and closed position when the closure rests in its lower position.

7. A fuel dispensing system comprising:
a fuel reservoir;
pump means associated with the reservoir for pumping fuel therefrom;
a fuel dispensing nozzle adapted to communicate with a fuel tank to be filled, the nozzle having a spout adapted to be inserted into the fuel tank to dispense fuel thereto and a vapor recovery passage adjacent to the spout and adapted to be connected to the tank for the return of vapor from the tank;
conduit means connecting the reservoir with the nozzle, the conduit having separate passages for liquid flow from the reservoir to the nozzle and for vapor flow from the nozzle to the reservoir; and
a vapor valve located in the conduit means, the valve comprising:
a body having a liquid passage and a vapor passage, the vapor passage having a first chamber, the liquid passage having a second chamber adjacent to the first chamber, the first chamber separated from the second chamber by a thin wall;
a poppet positioned in the first chamber of the vapor passage and movable between a closed position in which the flow of vapor through the vapor passage is blocked and an open position in which a vapor can flow through the vapor passage, the poppet having a permanent magnet portion adjacent to the thin wall; and
a closure positioned in the second chamber of the liquid passage, the closure resting in a closed position restricting the flow of liquid through the second chamber of the liquid passage, the closure movable to an open position in response to the flow of liquid through the second chamber, the closure being formed at least in part of a permanent magnet adjacent to the thin wall, the poles of the magnet of the closure being opposite the adjacent poles of the magnet portion of the poppet so that the magnetic attraction between the poppet and the closure causes the poppet to remain in the closed position in response to the presence of the closure to the closed position and causes the poppet to move to the open position in response to movement of the closure to the open position.

8. A fuel dispensing system as defined in claim 7, wherein the permanent magnet portion of the poppet is adjacent to the thin wall when the poppet of the vapor valve is adjacent to the thin wall when the poppet is in the closed position, and wherein the permanent magnet of the closure is adjacent the thin wall when the closure is in the closed position, whereby the poppet is urged to its closed position by attraction of the magnet of the closure.

9. A fuel dispensing system as defined in claim 8, wherein the vapor valve comprises in addition a magnetic force conducting element between the thin wall and poppet to enhance the magnetic attraction of the magnet of the closure.

10. A fuel dispensing system as defined in claim 9, wherein the magnetic force conducting element is a spring which also urges the poppet to its open position.

11. A fuel dispensing system as defined in claim 7, wherein the vapor valve comprises in addition a spring which urges the closure to its closed position when the flow of liquid through the second chamber is stopped.

* * * * *